Dec. 25, 1934.  H. LAMPART  1,985,833

METHOD OF MAKING GROOVED SLEEVES

Filed Dec. 14, 1931

Inventor:
Hugo Lampart
By [signature]
Attorney

Patented Dec. 25, 1934

1,985,833

UNITED STATES PATENT OFFICE 1,985,833

METHOD OF MAKING GROOVED SLEEVES

Hugo Lampart, Baden, Germany, assignor to Berlin-Karlsruher Industrie-Werke A. G., Karlsruhe, Germany Application December 14, 1931, Serial No. 581,046
In Germany December 20, 1930

1 Claim. (Cl. 205—8)

This invention relates to a method for the production of helical longitudinal grooves on the outer surface of cylindrical tubes, more particularly spinning bobbins for the artificial silk industry.

As compared, for example, with a rolling process, there is obtained by the method according to the invention the advantage of very simple production, as this process may immediately follow the usual drawing process for producing the sleeve, i. e., constitute a continuation thereof, so that the general production is one of a uniform nature.

In producing the body of the spool or sleeve it is possible to draw a plurality of sleeves simultaneously in one piece, the single sleeves being cut therefrom in the requisite length. This operation may be followed in a very simple manner by the method of producing the grooves in accordance with the invention.

A possible form of embodiment of the apparatus for carrying the invention into effect is illustrated in the accompanying drawing.

Figure 1:
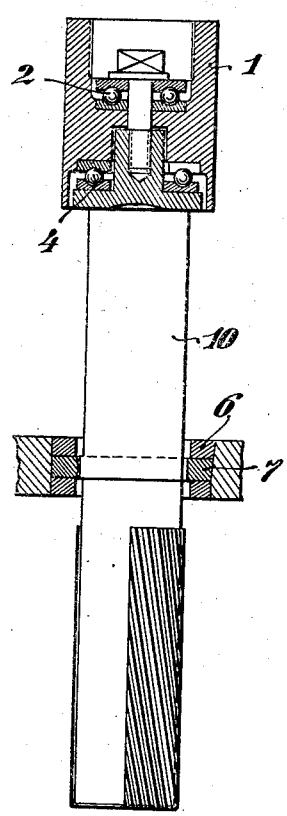
Fig. 1 shows, in longitudinal section, an apparatus for producing sleeves, which are grooved on the outside and smooth on the interior.
Figure 2:
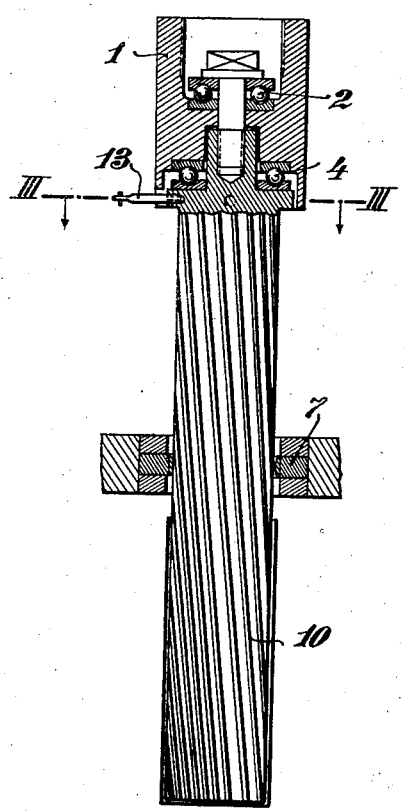
Fig. 2 is a cross-sectional view of a sleeve or spool produced according to the invention by the apparatus.
Figure 4:
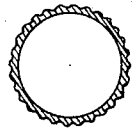
Figure 5:
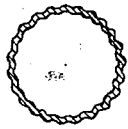
Figure 3:
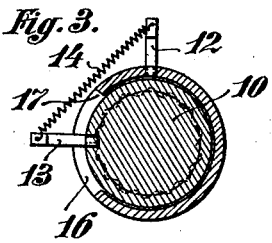

With the apparatus according to Fig. 1 there are produced sleeves or spools which are smooth on the inside but furnished with a corrugated or grooved exterior as in Fig. 2. The mandrel 10 is mounted in thrust bearings 2 and 4 in a member 1, which is firmly secured against rotation but is displaceable in the direction of the axis. The mandrel or core is forced through a stationary drawing ring 7 surrounding the same, which ring, for the production of sleeves according to Fig. 2, is provided with ribs conforming with the helically disposed grooves to be produced and acts as a matrix.

What I claim as new and desire to secure by Letters Patent is:

A method for producing spinning bobbins particularly for the artificial silk industry comprising placing a cylindrical tube having a smooth inner wall on a smooth and axially freely-rotatable mandrel and forcing the tube through a draw ring having internal helical ribs to form helical longitudinal grooves on the outer wall of the tube.

HUGO LAMPART.